US008725858B1

(12) United States Patent
Wu et al.

(10) Patent No.: US 8,725,858 B1
(45) Date of Patent: *May 13, 2014

(54) METHOD AND SYSTEM FOR SELECTING CONTENT BASED ON A USER'S VIRAL SCORE

(75) Inventors: Ping Wu, Saratoga, CA (US); Jennifer W. Lin, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/222,530

(22) Filed: Aug. 31, 2011

(51) Int. Cl.
*G06F 15/16* (2006.01)

(52) U.S. Cl.
USPC ........... 709/223; 709/203; 709/204; 709/219; 370/395.5; 370/464; 370/465

(58) Field of Classification Search
USPC ........... 709/203, 204, 223; 705/319; 707/748
See application file for complete search history.

(56) References Cited

U.S. PATENT DOCUMENTS

| | | | | |
|---|---|---|---|---|
| 8,135,800 | B1 * | 3/2012 | Walsh et al. | 709/217 |
| 8,332,512 | B1 * | 12/2012 | Wu et al. | 709/224 |
| 2008/0256233 | A1 * | 10/2008 | Hall et al. | 709/224 |
| 2009/0319359 | A1 * | 12/2009 | Soza et al. | 705/14.25 |
| 2010/0217720 | A1 * | 8/2010 | Jones et al. | 705/319 |
| 2010/0306030 | A1 * | 12/2010 | Mawani | 705/10 |
| 2011/0208749 | A1 * | 8/2011 | Guo et al. | 707/748 |
| 2012/0342121 | * | 1/2012 | Carr et al. | 709/229 |
| 2012/0158630 | A1 | 6/2012 | Zaman et al. | |
| 2012/0166530 | A1 * | 6/2012 | Tseng | 709/204 |
| 2012/0226564 | A1 | 9/2012 | Mirrokni Banadaki et al. | |
| 2013/0013595 | A1 * | 1/2013 | Tseng et al. | 707/723 |
| 2013/0046839 | A1 * | 2/2013 | Ransom et al. | 709/206 |

OTHER PUBLICATIONS

Bao et al. "AdHeat: An Influence-based Diffusion Model for Propagating Hints to Match Ads", WWW 2012, Apr. 2010, pp. 71-80.
Yang et al. "Mining Social Networks for Targeted Advertising" IEEE, Proceedings of the 39th Hawaii International Conference on System Science, 2006, pp. 1-10.

* cited by examiner

*Primary Examiner* — Ario Etienne
*Assistant Examiner* — Uzma Alam
(74) *Attorney, Agent, or Firm* — Birch, Stewart, Kolasch & Birch, LLP (57) ABSTRACT

Methods and systems for selecting and presenting a content item, such as an advertisement, to a user of a social network are provided, where the content item is selected based on a calculated "content propagation likelihood" for the user. A user's "content propagation likelihood" is a likelihood that an entity (e.g., video, audio clip, photograph, etc.) will spread throughout the user's social network, and the social networks of the user's friends, when the entity is shared (e.g., broadcast) by the user. A user's content propagation likelihood is computed using weighted measures of various ways in which an entity can spread through a social network. A user's content propagation likelihood may also be set for a given vertical (e.g., music, sports, etc.) and/or a given media type (e.g., images, videos, etc.) that pertains to the particular user.

26 Claims, 5 Drawing Sheets

METHOD AND SYSTEM FOR SELECTING CONTENT BASED ON A USER'S VIRAL SCORE

FIELD OF THE INVENTION

The present disclosure generally relates to systems and methods for providing content to users of a social network. More specifically, aspects of the present disclosure relate to selecting content items to send to a user of a social network based on the user's influence and activities within the social network.

BACKGROUND

The present age of social media and social networks offers tremendous opportunity for content publishers and advertisers to provide their content and advertisements to consumers (e.g., herein referred to as users). Content items, including advertisements, can be provided to users of a social network in various forms and contain many different pieces of information designed to attract the interests of the users. The impression that a particular item of content has on a particular social network user is of great value to content publishers, and especially to advertisers seeking to implement efficient and effective advertising strategies. As recognized by the inventors, it is important for content publishers such as advertisers to be able to differentiate among social network users based on how valuable each user is in terms of propagating content throughout one or more social networks.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for selecting content for presentation to a user in a social network, the method comprising: a server receiving usage information for a content item shared by a user in a social network; determining a content propagation likelihood for the user based on the received usage information; selecting one or more content items for presentation from a group of candidate content items based on the determined content propagation likelihood of the user; and providing the one or more selected content items for presentation to the user.

In another embodiment, the method for selecting content further comprises the server receiving user data for the user in the social network; and identifying at least one utilized media type of the user based on the received user data.

In another embodiment, the method for selecting content further comprises determining a content propagation likelihood for the user based on the identified at least one utilized media type of the user; and selecting one or more content items for presentation to the user based on the determined content propagation likelihood, the one or more selected content items being of the at least one utilized media type identified for the user.

In yet another embodiment, the method for selecting content further comprises the server receiving user data for the user in the social network; and identifying at least one vertical associated with actions of the user based on the received user data.

In another embodiment of the disclosure, the method for selecting content further comprises determining a content propagation likelihood for the user based on the identified at least one vertical associated with actions of the user; and selecting one or more content items for presentation to the user based on the determined content propagation likelihood, the one or more selected content items corresponding to the at least one vertical associated with actions of the user.

In another embodiment, the step of selecting one or more content items for presentation in the method for selecting content includes identifying a group of candidate content items based on the determined content propagation likelihood of the user; and filtering the group of candidate content items using at least one selection criteria specified for the user.

In still another embodiment, the step of selecting one or more content items for presentation in the method for selecting content includes identifying a group of candidate content items based on at least one content targeting criteria; ranking the candidate content items in the group based on the determined content propagation likelihood of the user; and selecting a candidate content item having a highest rank for presentation to the user.

Another embodiment of the present disclosure relates to a system for selecting content for presentation to a user comprising at least one processor; and a computer-readable medium coupled to the at least one processor having instructions stored thereon which, when executed by the at least one processor, causes the at least one processor to: receive usage information for a content item shared by a user in a social network; determine a content propagation likelihood for the user based on the received usage information; select one or more content items for presentation from a group of candidate content items based on the determined content propagation likelihood of the user; and provide the one or more selected content items for presentation to the user.

In another embodiment, the at least one processor of the system is further caused to receive user data for the user in the social network; and identify at least one utilized media type of the user based on the received user data.

In another embodiment, the at least one processor of the system is further caused to determine a content propagation likelihood for the user based on the identified at least one utilized media type of the user; and select one or more content items for presentation to the user based on the determined content propagation likelihood, the one or more selected content items being of the at least one utilized media type identified for the user.

In still another embodiment of the disclosure, the at least one processor of the system is further caused to receive user data for the user in the social network; and identify at least one vertical associated with actions of the user based on the received user data.

In yet another embodiment, the at least one processor of the system is further caused to determine a content propagation likelihood for the user based on the identified at least one vertical associated with actions of the user; and select one or more content items for presentation to the user based on the determined content propagation likelihood, the one or more selected content items corresponding to the at least one vertical associated with actions of the user.

In another embodiment of the disclosure, the at least one processor of the system is further caused to identify a group of candidate content items based on the determined content propagation likelihood of the user; and filter the group of candidate content items using at least one selection criteria specified for the user.

In another embodiment, the at least one processor of the system is further caused to identify a group of candidate content items based on at least one content targeting criteria; rank the candidate content items in the group based on the determined content propagation likelihood of the user; and select a candidate content item having a highest rank for presentation to the user.

In other embodiments of the present disclosure, the methods and systems described herein may optionally include one or more of the following additional features: the at least one selection criteria is based on one or more characteristics of the user; the at least one selection criteria is based on one or more utilized media types associated with actions of the user; the at least one content targeting criteria includes at least one of user device type, geographical location, and browser type; the usage information collected for the content item includes data about interactions with the content item by one or more other users in the social network, the content propagation likelihood for the user is determined using data about interactions with the content item by one or more other users in the social network and one or more adaptable weighting terms assigned to the data; the one or more adaptable weighting terms assigned to the data are adapted based on a characteristic of the user; and/or the one or more adaptable weighting terms assigned to the data are adapted based on a utilized media type associated with actions of the user.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Embodiments of the present disclosure relate to techniques, methods and systems for selecting and presenting a content item, such as an advertisement (sometimes referred to herein simply as an "ad"), to a user of a social network (e.g., an online community or system that provides a forum for users who are in different geographic locations to interact with each other) where the content item is selected and presented based on a determined or calculated "content propagation likelihood" or "ad propagation likelihood" of the user. While the following description includes many examples presented in the context of advertisements and makes reference to a user's "ad propagation likelihood," the scope of the present disclosure is not limited to advertisements. Instead, embodiments and features of the present disclosure are applicable to various content items in addition to or instead of advertisements, and thus reference may also be made to a user's "content propagation likelihood" as well as a variety of other similar such terms or phrases as described below.

As used herein, a user's "content propagation likelihood" refers to a likelihood or probability that an entity (e.g., an item of content such as a video, audio clip, news article, photograph, etc.) will spread throughout the user's social network, and the social networks of the user's friends, when the entity is shared (e.g., broadcast, reshared, commented on, endorsed, liked, recommended, etc.) by the user. As will be described in greater detail below, a user's content propagation likelihood may be determined (e.g., computed) using weighted measures of various ways in which an entity can spread (e.g., propagate) through a social network. It should be understood that the terms "content propagation likelihood" and "ad propagation likelihood" are exemplary in nature and are used herein to refer to the likelihood or probability that an entity (e.g., a content item) will spread throughout a user's social network and the social networks of the user's friends for purposes of brevity. As such, use of the terms "content propagation likelihood" and "ad propagation likelihood" in describing various aspects and features of the present disclosure is not in any way intended to limit the scope of the disclosure.

Additionally, various other terms or phrases may also be used to refer to the likelihood or probability that an entity will spread throughout a user's social network and the social networks of the user's friends. For example, reference may be made herein to a user's "Viral Score" or a user's "Viral Likelihood" without departing from the meaning of "content propagation likelihood" or "ad propagation likelihood" as described above.

An advertisement is an item of content (e.g., an "entity") that presents a piece of information to a user of a social network and is designed to be used in whole or in part by the user, as well as spread throughout the user's social network and the social networks of the user's friends. Ads can be provided (e.g., presented) to a user in electronic form, such as banner ads on a web page, as ads presented with search results, as ads presented with emails, and the like. Such electronic ads may also contain links to other electronic content including web pages, images, audio files, video files, etc.

Additionally, in one or more embodiments of the disclosure, a user's ad propagation likelihood may be calculated using a "share score" and a "reshare score" for the user. As used herein, a user's "share score" refers to a likelihood or probability that an entity will spread throughout the user's social network, and the social networks of the user's friends, when the entity is "shared" (e.g., broadcast) by the user. Similarly, a user's "reshare score" refers to a likelihood or probability that an entity will spread throughout the user's social network, and the social networks of the user's friends, when the entity is "reshared" by either the user, a friend of the user, or another user in the user's social network. In at least some embodiments, for a user to "reshare" an entity means that the user takes an entity that someone else shared and re-publicizes it to other users in the social network. When a "reshare" of an entity occurs, the identity of the user who originally shared the entity may or may not be preserved, depending on the implementation and/or the preferences of either the first sharing user or subsequent resharing user.

As with the terms "content propagation likelihood" and "ad propagation likelihood," it should be understood that the terms "share score" and "reshare score" are exemplary in nature and their use in describing various aspects and features of the present disclosure are not in any way intended to limit the scope of the disclosure. Additionally, numerous other terms or phrases may also be used to refer to the likelihood or probability that an entity will spread throughout a user's social network, and the social networks of the user's friends, when the entity is "shared" (e.g., broadcast) by the user or "reshared" by the user, one of the user's friends, or in some instances another user in the social network. In at least some embodiments, a user's "share score" may also include the user's level of connectivity within a social network (e.g., the number of other users in the network with which the user has a connection to or is in some type of relation with).

Furthermore, as will be described in greater detail below, a user's content propagation likelihood may be set for a given vertical (e.g., music, technology gadgets, sports, etc.) and/or a given media type (e.g., images, videos, audio clips, etc.) that pertains to the particular user. In at least one embodiment, high content propagation likelihoods for specific verticals can be used to determine the verticals from which to serve a user an item of content, such as an advertisement. For example, a user who frequently shares content related to music in a social network, and who has friends in the social network who often reshare such content initially shared by the user, may have a high content propagation likelihood for music and other related verticals. This high content propagation likelihood can be used to determine that the user should be served advertisements relating to music.

Similarly, in one or more other embodiments, a user's content propagation likelihood for certain media types can be used to determine the type of content or advertisement formats (e.g., text, static image, dynamic image, flash, video, etc.) to serve the user. For example, a user may prefer to share or comment on content that is presented to the user as a video, rather than content that consists of only text or static images. As such, the user may have a high content propagation likelihood for video content, and therefore be served with content items (e.g., advertisements) that are in video format rather than one of the other various media types.

Figure 1:
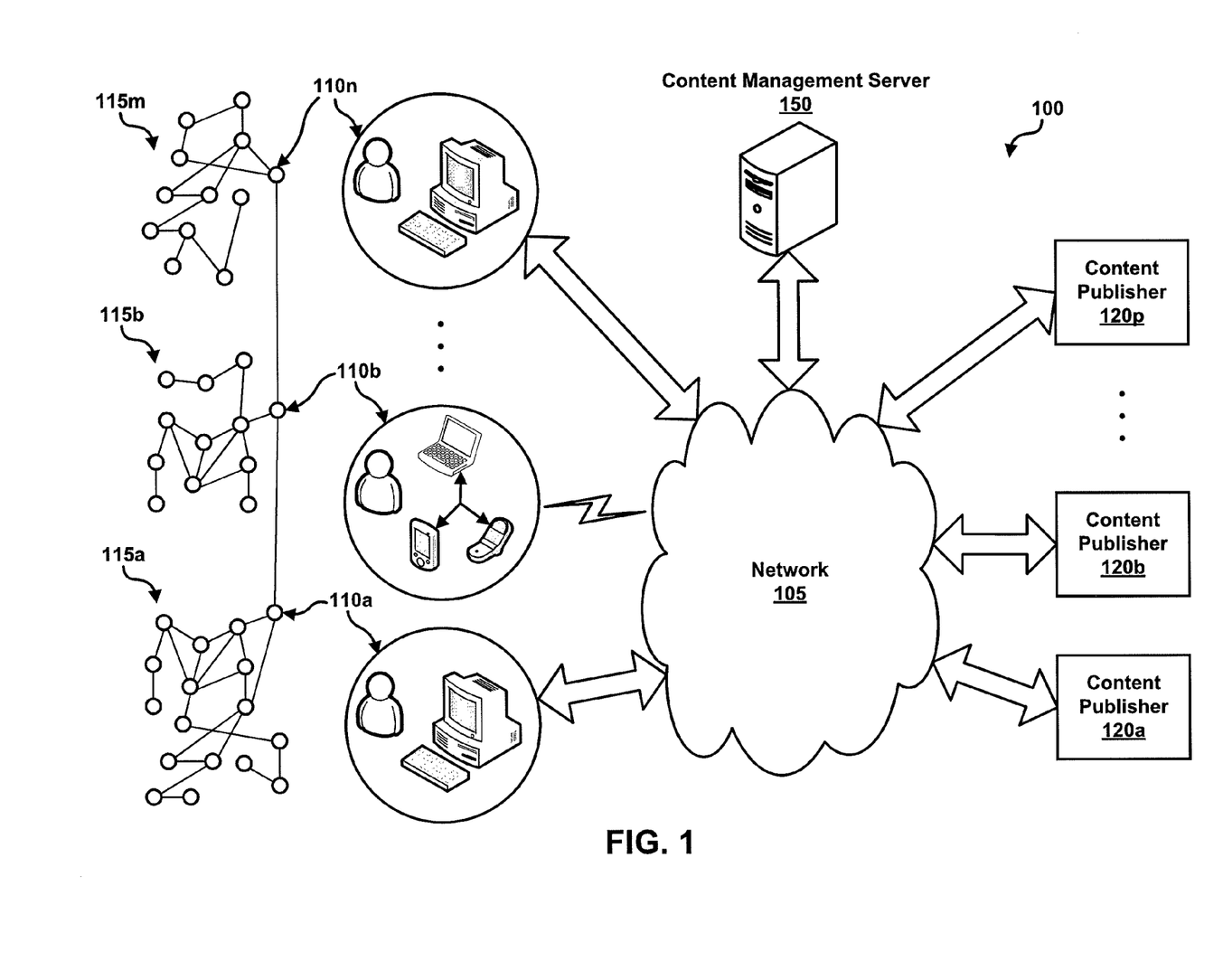
FIG. 1 is a schematic diagram illustrating an example content selection and presentation system in which various embodiments of the present disclosure may be implemented.

FIG. 1 is an example content selection and presentation system 100 in which various aspects and embodiments of the present disclosure may be implemented. The content selection and presentation system 100 may include content publishers 120a, 120b, up through 120p (where "p" is an arbitrary number), users 110a, 110b, up through 110n (where "n" is an arbitrary number), content management server 150, and a network 105. In scenarios where the content selection and presentation system 100 is implemented in the context of advertisements, the content publishers may instead be referred to as "advertisers" and the content management server referred to as an "ad management server" without limiting any of the features or capabilities of either component of the system as described herein. It should also be understood that while the following description of the content selection and presentation system 100 sometimes makes reference to advertisements, other forms of content, including other forms of sponsored content, may also be selected and provided in the content selection and presentation system 100.

The content publishers 120a, 120b, through 120p may directly or indirectly submit, log, maintain, and utilize information in the content management server 150. Additionally, depending on the implementation, the content publishers 120a, 120b, through 120p may be able to access and interact with the content management server 150 in one or more other ways. In at least some embodiments, the content publishers 120a, 120b, through 120p provide content items (e.g., ads) to the content management server 150 which, in turn, presents the content items to the users 110a, 110b, through 110n using various methods described in greater detail below. In some arrangements, these content items may be in the form of graphical ads, such as banner ads, audio ads, video ads, still image ads, text-only ads, as well as ads combining one or more of any such forms. The content items may also include embedded information or data, including links to one or more web pages, meta-information, and/or machine-executable instructions.

The users 110a, 110b, through 110n may be part of one or more social networks 115a, 115b, up through 115m (where "m" is an arbitrary number). In FIG. 1 the social networks 115a, 115b, through 115m are represented as graphs (e.g., social graphs) of nodes (e.g., users) connected to each other by edges, which indicate acquaintance relationships between the users. An acquaintance relationship between two users in a social network (e.g., two connected nodes in any of the graphs representing the social networks 115a, 115b, through 115m) can be either an explicit or implicit relationship.

An example of an explicit acquaintance relationship between two users in a social network may be a mutually-agreed upon designation as being "friends" or within a common "circle" or other explicit social graph in a social network. An example of an implicit acquaintance relationship may be where users 110a and 110n each have an explicit acquaintance relationship with user 110b, but users 110a and 110n do not have an explicit acquaintance relationship with each other. Instead, an implicit acquaintance relationship may exist between users 110a and 110n through their respective explicit acquaintance relationships with user 110b such that users 110a and 110n can still interact (e.g., chat, visit the other's profile page, etc.) with each other in the social network. In any of the various embodiments of the present disclosure, conventional methods or techniques for discovering a user's social connections and acquaintance relationships may also be used in addition to or instead of the example methods and techniques described above.

In some arrangements, the social networks 115a, 115b, through 115m shown in FIG. 1 may be different social networks (e.g., different online social communities or systems providing a forum for users to interact) to which some or all of the users 110a, 110b, through 110n belong. In other arrangements, the social networks 115a, 115b, through 115m may instead be different groups of users in the same social network, where each of the users 110a, 110b, through 110n have many acquaintance relationships with the users in each of their respective social network groups (e.g., social networks 115a, 115b, through 115m), but very few acquaintance relationships with users outside of their group.

Additionally, in some embodiments described herein, entity usage information may be provided to the content management server 150. Entity usage information may include measured or observed behavior of the users 110a, 110b, through 110n with regard to an entity that has been broadcast or shared among the users 110a, 110b, through 110n. For example, entity usage information may include information about whether or not a user has indicated he or she endorses (e.g., likes, recommends, suggests, etc.) the entity, has posted a comment about the entity, has sent a message (e.g., a text message, e-mail message, etc.) about the entity, has visited a web page associated with the entity, and various other information related to user-behavior with regard to the entity. Further explanation and details about entity usage information, including particular types of entity usage information that may be considered in calculating a likelihood or probability that an ad (e.g., a specific entity or item of content) will spread throughout a user's social network and the social networks of the user's friends, will be provided below.

The network 105 connects the users 110a, 110b, through 110n, the content publishers 120a, 120b, through 120p, and the content management server 150 so as to allow for the communication, collection, and exchange of data and information (e.g., advertisements, entity usage information, and other such content). In one or more embodiments, the network 105 may be the Internet, a local area network (LAN), wide area network (WAN), one or more telephony networks, a cloud computing network, or a combination thereof.

According to embodiments of the disclosure, a user in a social network (e.g., any of social networks 110a, 110b, through 110n shown in FIG. 1) may be given a content propagation likelihood (e.g., an "ad propagation likelihood" or "viral score") that indicates how likely an entity (e.g., video, audio clip, news article, photograph, etc.) will spread throughout the user's social network, and the social networks of the user's friends, when the entity is shared (e.g., broadcast) by the user. In at least some arrangements, a user's content propagation likelihood may be determined by the content management server 150 based on certain entity usage information and user data collected by the content management server 150 from the users 110a, 110b, through 110n. As will further described below, the content management server 150 may store a content propagation likelihood (e.g., in a database connected to or in communication with the content management server 150) for a user and use this content propagation likelihood to select and provide content items, such as advertisements, for presentation to the user.

Figure 2:
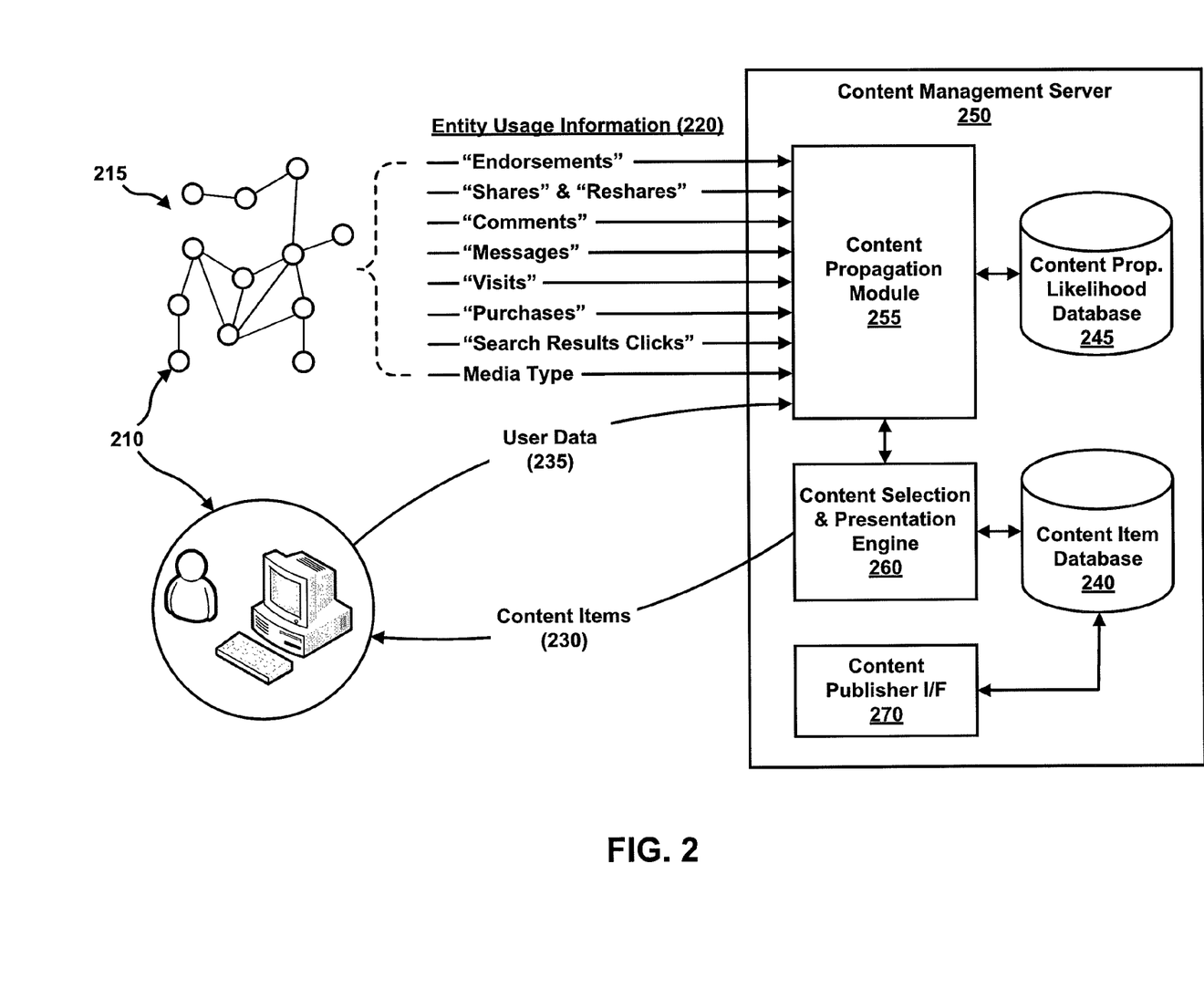
FIG. 2 is a block diagram illustrating an example content management system with example data flows to a user of a social network according to one or more embodiments described herein.

FIG. 2 illustrates an example content management server (which may also be referred to as an "ad management server" in the context of selecting and presenting advertisements) that may be configured to select and present content items to a user of a social network. Content management server 250 may be in communication (e.g., over network 105 shown in FIG. 1) with a user 210 of a social network 215 such that the content management server 250 may send content items 230 for presentation to the user 210 (e.g., on a display of a user device such as a computer, mobile telephone, etc.) and also receive or collect user data 235 from the user 210.

In at least the embodiment shown in FIG. 2, the content management server 250 may include a content propagation module 255, content selection and presentation engine 260, content publisher interface (I/F) 270, content propagation likelihood database 245, and content item database 240. In other embodiments, one or more of the content propagation module 255, content selection and presentation engine 260, content publisher interface (I/F) 270, content propagation likelihood database 245, and content item database 240 may be provided as independent components in communication with the content management server 250 in a manner known in the art. For example, the content management server 250 may be a distributed computing system.

Content publisher interface 270 is configured to provide an interface for content publishers or advertisers (e.g., content publishers 120a, 120b, through 120p shown in FIG. 1) to generate and manage content items (e.g., advertisements) for possible presentation to the user 210 of the social network 215. Content items created by content publishers via content publisher interface 270 are stored in content item database 240 as candidate content items that may later be identified and selected by the content selection and presentation engine 260 for presentation to the user 210. In some embodiments, a candidate content item stored in the content items database 240 may have one or more selection criteria associated with it.

The selection criteria may include, for example, certain parameters and/or restrictions that regulate the conditions under which the candidate content item (e.g., candidate ad) may be selected for presentation to a user. Such selection criteria may be provided by the content publisher or advertiser that created the content item or ad, by the content management server 250, or both. In one example, an advertiser may provide selection criteria for a particular ad that permits the ad to be considered for selection and presentation to a user only if the user is located in a certain geographic region or only if the time of selection and presentation falls within a certain date range (e.g., between a start date and an end date indicated by the advertiser). In another example, the content management server 250 may provide selection criteria restricting a candidate content item or ad from being considered for selection and presentation to a user who is under a certain age (e.g., a child under the age of eighteen or a user who has not yet reached age twenty-one).

In any of the embodiments of the present disclosure, conventional content and/or ad serving methods and systems may be utilized in conjunction with the various features described herein. Additionally, in at least some embodiments, an ad selection and presentation engine (e.g., content selection and presentation engine 260) identifies one or more candidate ads from an ads database (e.g., content items database 240), selects a particular one of the candidate ads, and presents the selected candidate ad (e.g., content item 230) to the user 210. In these embodiments, the ad selection and presentation engine identifies candidate ads for a particular user based on data and information associated with the user obtained from an ad propagation module (e.g., content propagation module 255). Furthermore, in at least some embodiments described herein, such data and information may include an ad propagation likelihood calculated for the user by the ad propagation module. When identifying candidate ads in the ads database, the ad selection and presentation engine may consider selection criteria associated with the candidate ads, as described above.

The content propagation module 255 collects entity usage information 220 from the social network 215 of the user 210 to use in calculating a content propagation likelihood for the user. Once the user's content propagation likelihood is calculated, it may be stored in the content propagation likelihood database 245 for later reference or retrieval by the content propagation module 255. For example, the content propagation module 255 may retrieve a user's content propagation likelihood from the content propagation likelihood database 245 to send to the content selection and presentation engine 260 for use in selecting one or more candidate content items (e.g., ads) for presentation to the user.

In some embodiments, the content selection and presentation engine 260 may directly reference a user's content propagation likelihood stored in the content propagation likelihood database 245. In at least one arrangement, the content propagation likelihood database 245 may be configured to update a user's stored content propagation likelihood in response to the content propagation module 255 collecting new entity usage information 220 relevant to the particular user. Additionally, although FIG. 2 shows the content propagation module 255 collecting entity usage information 220 from only the social network 215 of the user 210, it should be understood that the content propagation module 255 may also collect entity usage information from other social networks, such as those in which the user's friends belong.

It should be noted that in any of the various scenarios in which the methods or systems described herein collect personal information about a user, the user may be given the option to not have his or her personal information collected and/or used in any way. For example, a user may be provided with an opportunity to opt in/out of programs or features that may collect personal information, such as information about the user's geographic location, preferences, and the like. Furthermore, certain user data may be rendered anonymous in one or more ways before being stored and/or used, such that personally-identifiable information is removed. For example, a user's identity may be made anonymous so that no personally-identifiable information can be determined or collected for the user. Similarly, a user's geographic location may be generalized in situations where location information is obtained (e.g., limited to a city, zip code, or state level) so that a particular location of a user cannot be determined.

In one or more embodiments described herein, the entity usage information 220 collected by the content propagation module 255 from the user's social network 215 includes data related to the behavior and actions of users in the social network 215 with regard to a particular entity that is shared (e.g., broadcast, reshared, commented on, endorsed, liked, etc.) by the user 210. For example, the entity usage information 220 may include the number of "Endorsements" (e.g., "Likes," "Recommendations," "Annotations," etc.) of the entity by users in the social network 215, the number of "Reshares" of the entity by users, the number of "Comments" made about the entity, the number of "Messages" sent mentioning the entity, the number of "Visits" to a web page or physical location (e.g., store) associated with the entity, the number of "Purchases" of a product or service associated with the entity, and/or the number of "Search Results Clicks" on the entity. The above examples of various types of data that may be included in the entity usage information 220 will be described in greater detail below.

It should be noted that the entity usage information 220 collected by the content propagation module 255 is not limited to actions and behaviors of only those friends of the user 210 who are also in the user's social network 215, but can include friends of friends who may be in social networks other than social network 215. In one or more arrangements, aggregated user data collected, for example by the content propagation module 255, is normalized based on the population at large in the social network. Additionally, in embodiments where a user's "share score" or "reshare score" is calculated or determined, such scores may be normalized based on the number of "share" actions, "reshare" actions, etc., that occur in the user's social network.

In some embodiments, the entity usage information 220 collected by the content propagation module 255 may also include data or information related to one or more media types (e.g., images, videos, text, etc.) in which entities are shared (e.g., broadcast) by the user 210 and then interacted with by the user's friends. The content propagation module 255 may also receive or retrieve user data 235 from the user 210. The user data 235 may include data and information about one or more characteristics of the user 210. For example, the user data 235 may include information about the user's age, geographic location, hobbies, interests, and the like. Some of the information included in the user data 235 may be used by the content propagation module 255 to identify certain preferred verticals of the user 210, such as music, sports, cooking, etc.

In at least one embodiment described herein, a user's content propagation likelihood may be computed using weighted measures of the various ways in which an entity can spread (e.g., propagate) through a social network, which may correspond to the categories of entity usage information collected by the content propagation module 255. Entity usage information 220 may be collected by any of a variety of different methods and techniques, depending on the particular implementation. In some embodiments of the disclosure the entity usage information 220 and/or the user data 235 may be harvested in databases or tables. For example, such data and information can be provided by a social network (e.g., social network 215) to the content management server 250. In another example, a broadcast code snippet may be provided for inclusion in the social network's code by the content management server 250. In such an example, the broadcast code is specific to the content management server 250 such that whenever a user in the social network shares or broadcasts an entity, the broadcast code sends a notification (e.g., a ping) to the content management server 250 to record the details of the broadcast (e.g., action type, entity, etc.).

In at least one example, a user's content propagation likelihood may be computed as follows:

Content Propagation Likelihood=$w_1$("Endorsements")+$w_2$("Shares"&"Reshares")+$w_3$("Comments")+$w_4$("Messages")+$w_5$("Visits")+$w_6$("Purchases")++ . . . +$w_y$("Search Results Clicks")

where "y" is an arbitrary number, and where adaptive (or adaptable) weighting terms $\{w_i\}$ are used with each of the various components included in the computation. In the above expression: "Endorsements" (which may also be referred to as "Likes," "Recommendations," "Annotations," and other similar such terms or phrases) refers to the number of times the user and the user's friends indicate that they like, recommend, suggest, etc., the entity (e.g., by using a "like" or "recommendation" or social annotation indicator tool or similar function of the social network platform that tells other users of the social network that the indicating user likes or recommends the particular entity); "Shares" & "Reshares" refers to the number of times that the user broadcasts and/or likes the entity and also the number of times that the user's friends rebroadcast and/or re-like the entity initially shared or liked by the user. In at least some embodiments, "Shares" & "Reshares" also refers to the speed at which the entity propagates (e.g., the velocity of propagation) throughout the social network of the user and the social networks of the user's friends; "Comments" refers to the number of comments made by the user and the user's friends about the entity (e.g., as a posting on the user's social network profile, blog, etc.); "Messages" refers to the number of electronic communications (e.g., text messages, video chats, e-mails, etc.) about the entity sent by the user and the user's friends; "Visits" refers to the number of times the user and the user's friends visit a website or physical business location associated with the entity; "Purchases" refers to the number of purchases of product(s) and/or service(s) associated with the entity (if applicable); and "Search Results Clicks" refers to the number of times the user and the user's friends make search queries for the entity using the entity as a keyword, and then click on the search results pertaining to the entity.

In embodiments where "Shares" & "Reshares" also refers to the speed at which the entity propagates throughout the social network of the user and the social networks of the user's friends, the speed or velocity of propagation may be determined by the content management server 250 observing the number of users who received the broadcasted entity over various periods of time (e.g., minute, hour, day, week, month, etc.) and also the number of users who broadcasted the same entity over various periods of time. In some arrangements, one or more speed or velocity thresholds may be established to define different "speed categories" or "speed labels." For example, 100 broadcasts/hour may be considered "fast" while fewer broadcasts in the same time period may be considered "medium" or "slow," depending on the categorization approach used. Also, in some arrangements the thresholds established may be linear, such as 100 broadcasts/hour, 2400 broadcasts/day, etc., while in other arrangements the thresholds may be set according to exponential decay. Furthermore, different speed/velocity thresholds may be established for different types of entities or content. For example, video content may be rated according to higher speed thresholds than static images.

In at least some embodiments, the values of the adaptable weighting terms $\{w_i\}$ may be adapted (e.g., updated) based on the capabilities and functionalities of the particular social network platform involved, known characteristics or demographics of the user, historical trends and statistics related to the different ways that entities spread through social networks, and the like. For example, the weight attached to the number of visits to the website or physical business location associated with the entity, $w_6$, may be adapted accordingly in situations where the entity is not associated with any website or when the physical location of the business associated with the entity is in a country different from that of the user. In another example, the weighting terms may be adapted according to a particular vertical (e.g., sports, entertainment, travel, etc.) and/or according to a particular media type (e.g., video, audio, image, etc.).

It should be understood that numerous other measurements related to the various ways in which an entity can spread through a social network may also be used in addition to or instead of the example measurements described above. In alternative embodiments of the disclosure, the content propagation likelihood may be computed or determined in various other ways in addition to or instead of taking the sum of the weighted measurements. For example, the content propagation likelihood may be calculated using a multiplicative method or by using other mathematical operations. Additionally, the various names/labels used to identify the different ways an entity can spread through a social network (e.g., Endorsements, Reshares, Search Results Clicks, etc.) are exemplary in nature, and are not in any way intended to limit the scope of the disclosure.

In some embodiments described herein, a user's content propagation likelihood may be set for a given vertical that pertains to the particular user. For example, if a user is better known for his or her musical taste or knowledge/expertise, then whenever that user broadcasts an entity related to music (e.g., a musical audio clip), more of the user's friends are likely to pay attention. Accordingly, the user's content propagation likelihood for the music vertical will likely be higher than, for example, the user's content propagation likelihood for the tech gadgets vertical. Information about the user's high content propagation likelihoods for specific verticals can be used to determine which verticals to serve content items (e.g., advertisements) from.

In other embodiments described herein, a user's content propagation likelihood may also be set for a given media type (e.g., videos, images, audio clips, etc.) associated with the particular user in one or more ways. For example, if it is determined that a user often shares images and videos with his or her friends or followers in the user's social network, yet the user's friends or followers tend to like/reshare/comment on the videos more than the images, then the user's content propagation likelihood for video will likely be higher than the user's content propagation likelihood for image. Information about the user's high content propagation likelihoods for particular media types can be used to determine which type of content item or advertisement format (e.g., text, static image, dynamic image, flash, video, etc.) to serve to the user.

Figure 3:
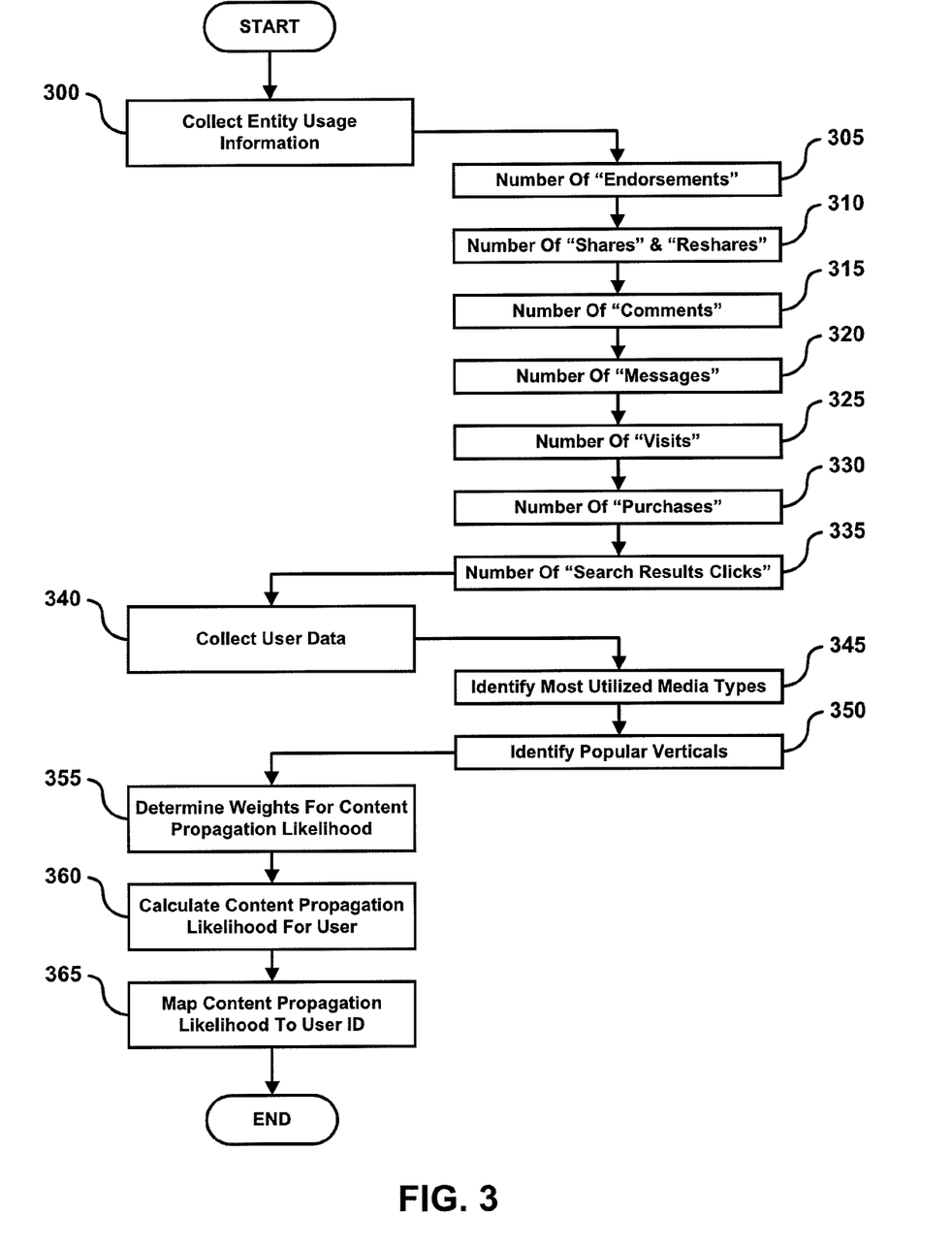
FIG. 3 is a flowchart illustrating an example method for computing a content propagation likelihood according to one or more embodiments described herein.

FIG. 3 is a flowchart illustrating an example process for computing a user's content propagation likelihood (or in some implementations, the user's ad propagation likelihood) according to one or more embodiments of the present disclosure. In at least some implementations, the following steps may be carried out by a content management server (e.g., content management server 250 shown in FIG. 2) configured to select and provide content items (e.g., advertisements) for presentation to a user in a social network (e.g., user 210 in social network 215 shown in FIG. 2).

The process begins in step 300 where entity usage information is collected or received (e.g., entity usage information 220 collected or received by the content management server 250 shown in FIG. 2). In at least one embodiment, the entity usage information collected in step 300 may be usage information for a content item shared (e.g., broadcast) by a user in a social network. Such usage information may be collected or received from the social network of the user, and may include a variety of information related to measured or observed behavior of other users in the social network with regard to the content item broadcast or shared by the user. Depending on the implementation, the entity usage information may be collected or received in step 300 by any of a variety of different methods and techniques, and may further be harvested in databases or tables associated with the content management server. In one example, the usage data and information collected or received in step 300 may actually be provided by the social network. In another example, whenever the user in the social network shares or broadcasts a content item, a broadcast code snippet included in the social network's code, and specific to the content management server, may initiate a recording action that causes the content management server to record the details of the broadcast.

In any of the various implementations, step 300 of the process illustrated in FIG. 3 may include or be followed by collecting the number of "endorsements" (e.g., "likes," "recommendations," "annotations," etc.) in step 305, the number of "shares" and "reshares" in step 310, the number of "comments" in step 315, the number of "messages" in step 320, the number of "visits" in step 325, the number of "purchases" in step 330, and the number of "search results clicks" in step 335. These various types of usage information collected in steps 305 through 335 can have the same meanings as those used in describing FIG. 2 above.

In step 340 user data may be collected or received (e.g., user data 235 collected or received by the content management server 250 shown in FIG. 2) for the user. In at least some embodiments, the user data collected in step 340 may include data and information about one or more characteristics of the user. For example, the user data collected in step 340 may include information about the user's age, geographic location, hobbies, interests, and the like. Some of the information included in the user data collected in step 340 may be used in step 345 to identify media types frequently utilized by the user and in step 350 to identify popular verticals of the user, such as music, sports, cooking, etc.

As mentioned above, in any or all of the steps of the process illustrated in FIG. 3, the user may be provided with the opportunity to opt-out of having his or her personal information collected and/or used. Additionally, certain user data, such as that collected in any of steps 300 through 340 may be rendered anonymous in one or more ways before being stored and/or used, such that personally-identifiable information is removed.

Following the identification of the most utilized media types of the user in step 345 and the identification of popular verticals of the user in step 350, the process continues to step 355 where weights are determined for calculating a content propagation likelihood for the user in step 360. In step 355, the values of one or more weighting terms (e.g., weighting terms $\{w_i\}$ described in the above expression for calculating a content propagation likelihood) may be determined and/or adapted based on capabilities or functionalities specific to the social network involved, known characteristics and/or demographics of the user, historical trends and statistics related to the different ways that content can spread through social networks, and other similar factors and considerations. In at least one embodiment the weighting terms may be determined or adapted in step 355 according to a particular vertical (e.g., sports, entertainment, travel, etc.) popular to the user and/or according to a particular media type (e.g., video, audio, image, etc.) utilized frequently by the user.

Once the weights have been determined in step 355, the process moves to step 360 where the content propagation likelihood is determined (e.g., calculated) for the user. As described above, a user's content propagation likelihood (which may also be referred to as a user's "ad propagation likelihood," "viral score," or other similar such terms) indicates how likely a content item (e.g., video, audio clip, news article, photograph, etc.) will spread throughout the user's social network, and the social networks of the user's friends, when the content item is shared or broadcast by the user. In at least some embodiments, the user's content propagation likelihood may be calculated by taking the sum of some or all of the measurements obtained from the collected usage information and user data in steps 300 through 350, weighted according to the weights determined in step 355. Such a calculation may be similar to the example expression presented above in the description of FIG. 2. In other embodiments, the user's content propagation likelihood may be computed or determined in various alternative ways, such as by using a multiplicative method or by using other mathematical operations involving the collected usage information, user data, and weighting terms.

Figure 4:
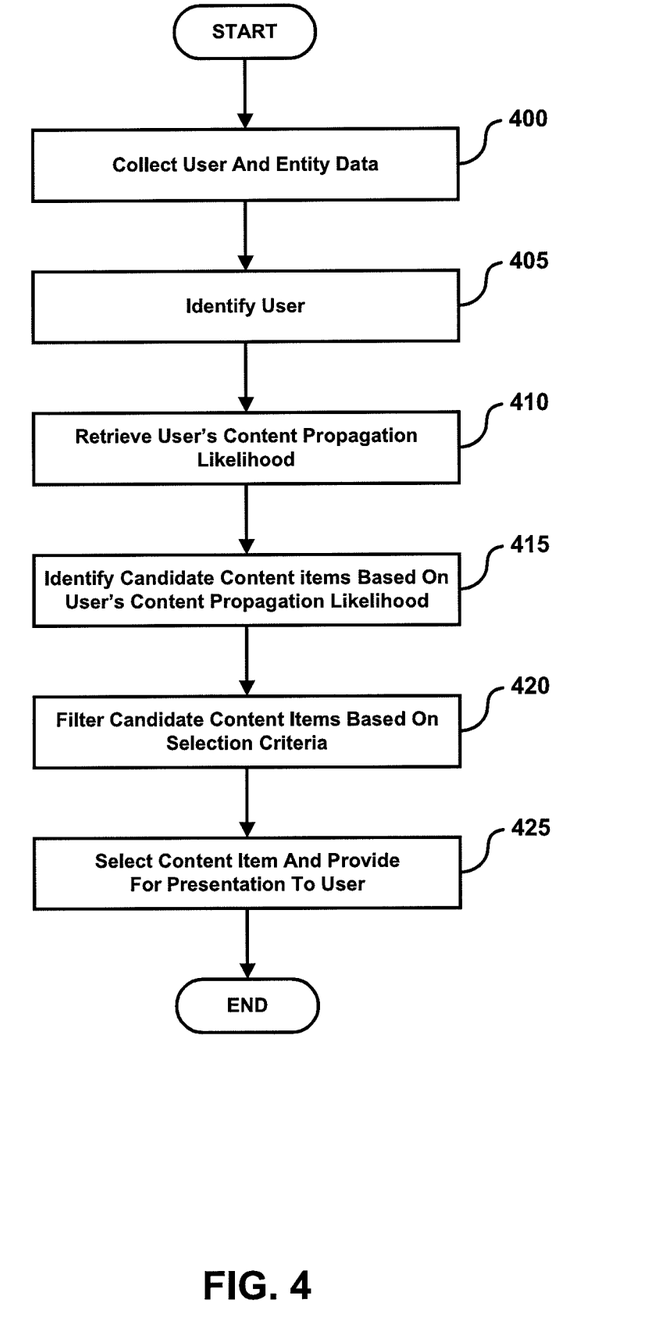
FIG. 4 is a flowchart illustrating an example method for selecting a content item for presentation to a user according to one or more embodiments described herein.

FIG. 4 is a flowchart illustrating an example process for selecting an item of content (e.g., an advertisement) for presentation to a user based on the user's content propagation likelihood according to one or more embodiments described herein.

The process begins in step 400 where user and entity data is collected or received (e.g., by the content management server 250 shown in FIG. 2). The user data collected or received may include, for example, user identification information (e.g., a username, user credentials, authentication token, etc.), one or more characteristics related to the user, and the like, while the entity data collected may include a request for content (e.g., a request to view a video or text file, listen to an audio clip, play a game, etc.) or a search request.

In step 405 the user is identified based on the user data collected in step 400. As in any of the other scenarios described herein in which various methods or systems collect personal information about a user, before either of steps 400 or 405 of the process shown in FIG. 4 the user may be given the option to not have his or her personal information collected and/or used in any way. Furthermore, the user data collected in step 400 may be rendered anonymous in one or more ways before being stored and/or used (as in step 405), such that personally-identifiable information is removed. For example, a user's identity may be made anonymous so that no personally-identifiable information can be determined or collected for the user in step 400. In such a scenario, step 405 of the process may include identifying the user according to some alternative non-personal identification scheme.

After the user is identified in step 405, the process moves to step 410 where the user's content propagation likelihood is retrieved. In at least one embodiment, once a user's content propagation likelihood has been calculated (e.g., as in step 360 of the process shown in FIG. 3), it may be stored in a database (e.g., the content propagation likelihood database 245 of content management server 250 shown in FIG. 2) for later reference or retrieval, as in step 410. In a scenario where the user does not have a content propagation likelihood stored for retrieval, or where a certain period of time (e.g., one week, one month, etc.) has passed since the user's content propagation likelihood was last retrieved, then step 410 may include calculating a new content propagation likelihood for the user or updating an existing content propagation likelihood. In such a scenario, the calculating or updating of an content propagation likelihood for the user may proceed according to the exemplary steps illustrated in FIG. 3 and described in detail above.

In step 415 of the process, the user's content propagation likelihood may be used to identify candidate content items, such as advertisements, for selection and presentation to the user (e.g., by content selection and presentation engine 260 of the content management server 250 shown in FIG. 2). In one or more embodiments, candidate content items may be identified in step 415 by matching a large set (e.g., database) of content items to one or more general content targeting criteria. Some examples of such content (e.g., advertisement) targeting criteria include the type of user device being utilized by the user, high-level geographical location of the user (e.g., country), type of browser being used, and other similar demographics general or generic in nature.

Once candidate content items have been identified in step 415, the process continues to step 420 where the candidate content items may be filtered based on one or more selection criteria. In at least some embodiments, a content item stored, for example, in a content item database of the content management server (e.g., content item database 240 of content management server 250 shown in FIG. 2) may have one or more selection criteria attached to or associated with it. These selection criteria may include, for example, parameters and/or restrictions that regulate the conditions under which the candidate content item may be selected for presentation to a user. Furthermore, such selection criteria may be provided by the content publisher that created the content item, or by the content management server, or both. In one scenario, selection criteria may be provided for a particular content item such that the content item can only be considered for selection and presentation to users who are located in a certain geographical location or region. In a different scenario, selection criteria may be provided that prevents a candidate content item from being considered for selection and/or presentation to a user who does not satisfy a certain minimum age requirement.

In step 425, one or more of the candidate content items remaining after the filtering in step 420 is selected and provided for presentation to the user. In one example, the selected candidate content item, which may be an advertisement, is provided for presentation on a display of a user device being utilized by the user. Additionally, in at least some embodiments of the disclosure a candidate content item may be selected in step 425 following the running of an auction by the content management server, where the auction considers, among other things, the user's content propagation likelihood. Where an auction is ran to select a candidate content item for presentation to the user, a group of candidate content items may be ranked according to any of a variety of factors or criteria, including the content propagation likelihood of the user. In at least one example, such an auction may factor into the ranking and selection process the effective cost per impression ("CPI" or "CPM") for each of the candidate content items. The effective CPM for a candidate content item may or may not incorporate the user's content propagation likelihood, depending on the particular implementation involved.

Figure 5:
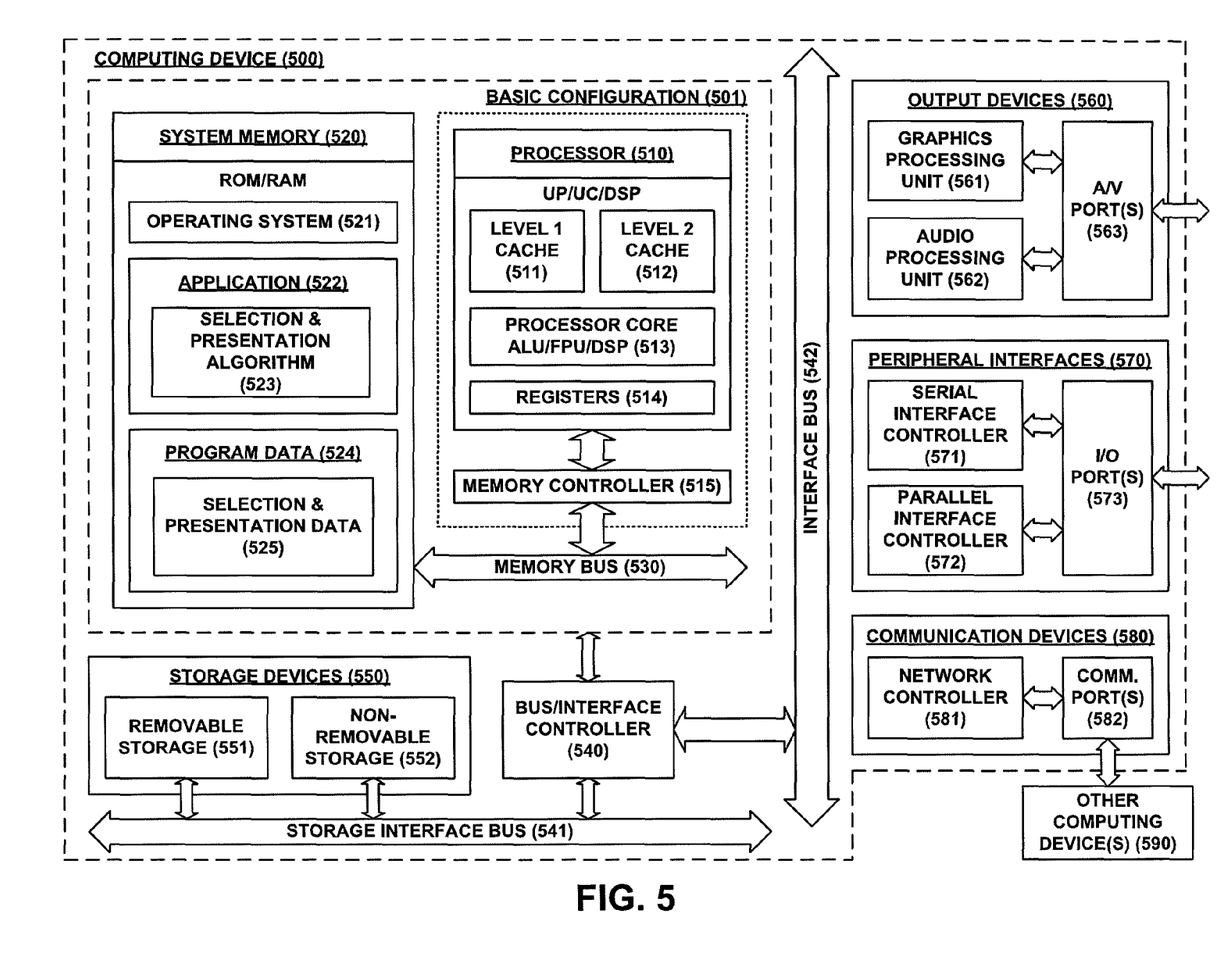
FIG. 5 is a block diagram illustrating an example computing device arranged for selecting and presenting content according to one or more embodiments described herein.

FIG. 5 is a block diagram illustrating an example computing device 500 that is arranged for selecting and presenting a content item (e.g., an advertisement) to a user or user device in accordance with one or more embodiments of the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 can be of any type including but not limited to a microprocessor (μP), a microcontroller (μC), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 can also be used with the processor 510, or in some embodiments the memory controller 515 can be an internal part of the processor 510.

Depending on the desired configuration, the system memory 520 can be of any type including but not limited to volatile memory (e.g., RAM), non-volatile memory (e.g., ROM, flash memory, etc.) or any combination thereof. System memory 520 typically includes an operating system 521, one or more applications 522, and program data 524. In at least some embodiments, application 522 includes a selection and presentation algorithm 523 that is configured to select one or more content items, such as advertisements, and provide the one or more content items to a user device for presentation to a user. The selection and presentation algorithm is further arranged to identify candidate content items for presentation to a user and then select from among those candidates one or more content items based on information and data associated with the user (e.g., a content propagation likelihood, selection criteria, etc.).

Program Data 524 may include selection and presentation data 525 that is useful for selecting an item of content (e.g., an advertisement) and for generating a content propagation likelihood for a user. In some embodiments, application 522 can be arranged to operate with program data 524 on an operating system 521 such that a user's content propagation likelihood can be calculated based on entity usage information collected from a social network of the user, and the social networks of the user's friends, and then used to select one or more content items for presentation to the user.

Computing device 500 can have additional features and/or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of computing device 500.

Computing device 500 can also include an interface bus 542 for facilitating communication from various interface devices (e.g., output interfaces, peripheral interfaces, communication interfaces, etc.) to the basic configuration 501 via the bus/interface controller 540. Example output devices 560 include a graphics processing unit 561 and an audio processing unit 562, either or both of which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication (not shown) via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method for selecting content for presentation to a user, the method comprising:
   determining, by a server, for each of a plurality of interaction types, a quantity of interactions with a content item shared by a user in a social network, the quantity of interactions being based on interactions with the content item by one or more other users in the social network;
   determining a content propagation likelihood for the user based on the quantities of interactions with the content item and weightings determined for the quantities of interactions, wherein the weightings are determined based on data received for the plurality of interaction types;
   selecting one or more content items for presentation from a group of candidate content items based on the determined content propagation likelihood of the user; and
   serving, via a computer network, the one or more selected content items to a computing device in a format suitable for presentation to the user on the computing device.

2. The method of claim 1, further comprising:
receiving, at the server, user interaction data for each of the plurality of interaction types, the user interaction data including data about actions of the user in the social network; and
identifying at least one utilized media type of the user based on the received user interaction data.

3. The method of claim 2, further comprising:
updating the content propagation likelihood determined for the user based on the identified at least one utilized media type of the user; and
selecting one or more content items for presentation to the user on the computing device based on the updated content propagation likelihood, the one or more selected content items being of the at least one utilized media type identified for the user.

4. The method of claim 1, further comprising:
receiving, at the server, user interaction data for each of the plurality of interaction types, the user interaction data including data about actions of the user in the social network; and
identifying at least one vertical associated with the user based on the data about actions of the user.

5. The method of claim 4, further comprising:
updating the content propagation likelihood determined for the user based on the identified at least one vertical associated with the user; and
selecting one or more content items for presentation to the user based on the updated content propagation likelihood, the one or more selected content items corresponding to the at least one vertical associated with the user.

6. The method of claim 1, wherein selecting the one or more content items for presentation includes:
identifying a group of candidate content items based on the determined content propagation likelihood of the user; and
filtering the group of candidate content items using at least one selection criteria specified for the user.

7. The method of claim 6, wherein the at least one selection criteria is based on one or more characteristics of the user.

8. The method of claim 6, wherein the at least one selection criteria is based on one or more utilized media types associated with actions of the user.

9. The method of claim 1, wherein selecting the one or more content items for presentation includes:
identifying a group of candidate content items based on at least one content selection criteria;
ranking the candidate content items in the group based on the determined content propagation likelihood of the user; and
selecting a candidate content item having a highest rank for presentation to the user.

10. The method of claim 9, wherein the at least one content selection criteria includes at least one of user device type, geographical location, and browser type.

11. The method of claim 1, further comprising:
receiving, at the server, data for each of the plurality of interaction types, the received data including data about actions of the user, data about the social network, or both; and
determining a weighting for each of the quantities of interactions based on the data received for the interaction type.

12. The method of claim 1, further comprising updating the weightings determined for the quantities of interactions based on a characteristic of the user, wherein the content propagation likelihood for the user is determined based on the quantities of interactions with the content item and the updated weightings for the quantities of interactions.

13. The method of claim 1, further comprising updating the weightings determined for the quantities of interactions based on a utilized media type associated with actions of the user, wherein the content propagation likelihood for the user is determined based on the quantities of interactions with the content item and the updated weightings for the quantities of interactions.

14. A system for selecting content for presentation to a user, the system comprising:
at least one processor; and
a non-transitory computer-readable medium coupled to the at least one processor having instructions stored thereon which, when executed by the at least one processor, causes the at least one processor to:
determine, for each of a plurality of interaction types, a quantity of interactions with a content item shared by a user in a social network, the quantity of interactions being based on interactions with the content item by one or more other users in the social network;
determine a content propagation likelihood for the user based on the quantities of interactions with the content item and weightings determined for the quantities of interactions, wherein the weightings are determined based on data received for the plurality of interaction types;
select one or more content items for presentation from a group of candidate content items based on the determined content propagation likelihood of the user; and
serve, via a computer network, the one or more selected content items to a computing device in a format suitable for presentation to the user on the computing device.

15. The system of claim 14, wherein the at least one processor is further caused to:
receive user interaction data for each of the plurality of interaction types, the user interaction data including data about actions of the user in the social network; and
identify at least one utilized media type of the user based on the received user interaction data.

16. The system of claim 15, wherein the at least one processor is further caused to:
update the content propagation likelihood for the user based on the identified at least one utilized media type of the user; and
select one or more content items for presentation to the user on the computing device based on the updated content propagation likelihood, the one or more selected content items being of the at least one utilized media type identified for the user.

17. The system of claim 14, wherein the at least one processor is further caused to:
receive user interaction data for each of the plurality of interaction types, the user interaction data including data about actions of the user in the social network; and
identify at least one vertical associated with the user based on the data about actions of the user.

18. The system of claim 17, wherein the at least one processor is further caused to:
update the content propagation likelihood for the user based on the identified at least one vertical associated with the user; and
select one or more content items for presentation to the user based on the updated content propagation likelihood, the one or more selected content items corresponding to the at least one vertical associated with the user.

19. The system of claim 14, wherein the at least one processor is further caused to:
   identify a group of candidate content items based on the determined content propagation likelihood of the user; and
   filter the group of candidate content items using at least one selection criteria specified for the user.

20. The system of claim 19, wherein the at least one selection criteria is based on one or more characteristics of the user.

21. The system of claim 19, wherein the at least one selection criteria is based on one or more utilized media types associated with actions of the user.

22. The system of claim 14, wherein the at least one processor is further caused to:
   identify a group of candidate content items based on at least one content selection criteria;
   rank the candidate content items in the group based on the determined content propagation likelihood of the user; and
   select a candidate content item having a highest rank for presentation to the user.

23. The system of claim 22, wherein the at least one content selection criteria includes at least one of user device type, geographical location, and browser type.

24. The system of claim 14, wherein the at least one processor is further caused to:
   receive data for each of the plurality of interaction types, the received data including data about actions of the user, data about the social network, or both; and
   determine a weighting for each of the quantities of interactions based on the data received for the interaction type.

25. The system of claim 14, wherein the at least one processor is further caused to:
   update the weightings determined for the quantities of interactions based on a characteristic of the user; and
   determine the content propagation likelihood for the user based on the quantities of interactions with the content item and the updated weightings for the quantities of interactions.

26. The system of claim 14, wherein the at least one processor is further caused to:
   update the weightings determined for the quantities of interactions based on a utilized media type associated with actions of the user; and
   determine the content propagation likelihood for the user based on the quantities of interactions with the content item and the updated weightings for the quantities of interactions.

* * * * *